(12) United States Patent
Miyauchi et al.

(10) Patent No.: US 8,309,265 B2
(45) Date of Patent: Nov. 13, 2012

(54) ELECTROLYTE MEMBRANE FOR FUEL CELLS, ITS PRODUCTION AND FUEL CELL USING THE SAME

(75) Inventors: Akihiro Miyauchi, Hitachi (JP); Kenichi Souma, Mito (JP); Shuichi Suzuki, Hitachi (JP); Yoshiyuki Takamori, Hitachinaka (JP); Masahiko Ogino, Hitachi (JP); Takashi Ando, Hitachi (JP); Hidetoshi Honbo, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1156 days.

(21) Appl. No.: 10/929,370

(22) Filed: Aug. 31, 2004

(65) Prior Publication Data

US 2006/0057448 A1    Mar. 16, 2006

(30) Foreign Application Priority Data

Sep. 12, 2003   (JP) ................................ 2003-321191

(51) Int. Cl.
*H01M 8/10*   (2006.01)
(52) U.S. Cl. .......................................... 429/479; 521/29
(58) Field of Classification Search .................. None
See application file for complete search history.

(56) References Cited

U.S. PATENT DOCUMENTS

| | | | | |
|---|---|---|---|---|
| 5,876,867 A | * | 3/1999 | Itoh et al. .................... | 429/44 |
| 5,879,828 A | * | 3/1999 | Debe et al. ................... | 429/41 |
| 2003/0235737 A1 | * | 12/2003 | Jeon et al. .................... | 429/30 |
| 2004/0062979 A1 | * | 4/2004 | Beckmann et al. ............. | 429/38 |

FOREIGN PATENT DOCUMENTS

| | | |
|---|---|---|
| JP | 3-158486 | 7/1991 |
| JP | 3-167752 | 7/1991 |
| JP | 4-169069 | 6/1992 |
| JP | 5-258756 | 10/1993 |
| JP | 6-267556 | 9/1994 |
| JP | 9-277226 | 10/1997 |
| JP | 9-320616 | 12/1997 |
| JP | 2003-68328 | 3/2003 |

OTHER PUBLICATIONS

Japanese Official Action mailed Jan. 26, 2010, for JP Application No. 2004-247690.
Japanese Official Action mailed Sep. 14, 2010, for JP Application No. 2004-247690.

* cited by examiner

*Primary Examiner* — Maria J Laios
(74) *Attorney, Agent, or Firm* — Antonelli, Terry, Stout & Kraus, LLP.

(57) ABSTRACT

The present invention provides an electrolyte membrane for a fuel cell that has a minute projection cluster on one side or both sides of a polymer electrolyte membrane. Further, the present invention provides a production method of an electrolyte membrane for a fuel cell, wherein a mold comprising convex portions having a fixed planar pattern is pressed on one side or both sides of a polymer electrolyte membrane, then while concave portions of the polymer electrolyte membrane formed in the concave portions are being stretched, the mold is removed from the polymer electrolyte membrane for forming a minute projection cluster.

18 Claims, 5 Drawing Sheets

A-A CROSS SECTION

A-A CROSS SECTION

ELECTROLYTE MEMBRANE FOR FUEL CELLS, ITS PRODUCTION AND FUEL CELL USING THE SAME

The present application claims priority from Japanese application JP2003-321191 filed on Sep. 12, 2003, the content of which is hereby incorporated by reference in this application.

BACKGROUND OF THE INVENTION

The present invention relates to a novel electrolyte membrane for fuel cells, production thereof and a fuel cell using the same.

PRIOR ART

Fuel cells that use a polymer electrolyte membrane have in recent years increased remarkably in their performance due to progress in electrolyte membranes and catalyst technology, and are gathering attention as a power source for low pollution vehicles and as a high-efficiency power generation method. Fuel cells can have a structure in which a reaction layer, which comprises an oxidation-reduction catalyst, is formed on a surface of a fuel cell using a polymer electrolyte membrane. In such cases, it is known that if the surface area formed having irregularities on the surface of the polymer electrolyte membrane is increased, electrochemical reaction efficiency increases.

The techniques disclosed in patent documents 1 to 3 are known as techniques for increasing surface area.

(Patent document 1) JP-A-9-320616
(Patent document 2) JP-A-9-277226
(Patent document 3) JP-A-2003-68328

The surface irregularities of an electrolyte membrane formed according to conventional techniques have a hilly shape, and the irregularities are large, whereby an increase in the surface area, which is being demanded by the increasing power of fuel cells in recent years, has been unable to be achieved.

It is an object of the present invention to provide a high-power fuel cell by using an electrolyte membrane having a surface area that is increased over a conventional electrolyte membrane.

Other objects, features and advantages of the invention will become apparent from the following description of the embodiments of the invention taken in conjunction with the accompanying drawings.

SUMMARY OF THE INVENTION

According to the present invention, provided is a fuel cell which uses an electrolyte membrane for a fuel cell that has a minute projection cluster on one side or both sides of a polymer electrolyte membrane.

Figure 1:
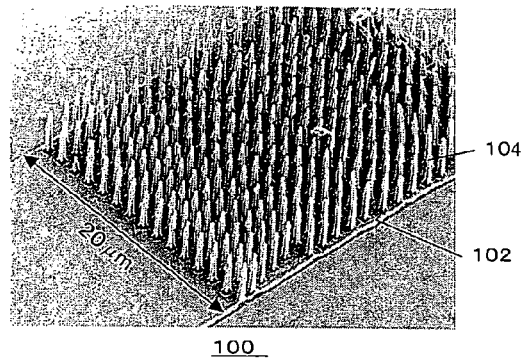
FIG. 1 is a scanning electron microscopic image that illustrates the structure of a pillar-shaped minute projection cluster.

The reference numerals will now be explained. Reference numeral 100 denotes a projection aggregate, reference numerals 104 and 301 denote a pillar-shaped minute projection, reference numerals 102 and 201 denote a polymer electrolyte membrane, reference numeral 112 denotes a fuel chamber, reference numeral 113c denotes a cathode end plate, reference numeral 113a denotes an anode end plate, reference numeral 128 denotes a fuel supply pipe, reference numeral 105 denotes an exhaust hole, reference numeral 103 denotes an output terminal, reference numeral 131 denotes a gas-liquid separation pipe, reference numeral 127 denotes a fuel separation channel, reference numerals 142a, 142b and 142c denote a current collector, reference numeral 151 denotes an interconnector, reference numeral 122 denotes a slit, reference numeral 181 denotes a substrate, reference numeral 203 denotes a mold, reference numeral 204 denotes a metal mount, reference numeral 303 denotes a carbon sheet, reference numeral 304 denotes catalyst carried grains, reference numeral 305 denotes an anode electrode power collection material, reference numeral 306 denotes a cathode electrode power collection material, reference numerals 601 denotes a cathode electrode plate, reference numerals 602 and 606 denote a diffusion layer, reference numeral 603 denotes a cathode catalyst, reference numeral 604 denotes an electrolyte membrane, reference numeral 605 denotes an anode catalyst, reference numeral 607 denotes an anode electrode plate, reference numeral 608 denotes packing, reference numeral 609 denotes an aqueous methanol solution inlet, reference numeral 610 denotes a fuel chamber, reference numeral 611 denotes a fixing screw, reference numeral 701 denotes a display device, reference numeral 702 denotes a DMFC, reference numeral 703 denotes a mainboard, reference numeral 704 denotes a lithium ion secondary battery, reference numeral 705 denotes a digital assistant main body and reference numeral 706 denotes a hinge.

DETAILED DESCRIPTION OF THE INVENTION

A high-power fuel cell can be obtained by using an electrolyte membrane having a surface area made larger than that of a conventional electrolyte membrane.

An optimal embodiment for carrying out the present invention will now be explained. It should be noted, however, that the present invention is not to be limited to the examples illustrated in the following.

The electrolyte membrane according to the present examples is an electrolyte membrane for a fuel cell which comprises a minute projection cluster formed by plastic working on one side or both sides of a polymer electrolyte membrane.

The minute projections are formed following a fixed shape, and are pillar-shaped. Pillar-shaped is defined as being relatively long and having a high aspect ratio, rather than having an irregular shape and broadening towards the tip as in the conventional art. Their diameter is from 10 nm to 500 μm, height from 50 nm to 5000 μm, wherein the ratio (H/D; aspect ratio) of height (H) to corresponding diameter (D) is more than 0.5, preferably from 1 to 100 and more preferably from 1 to 10.

When the diameter is kept fixed and the aspect ratio increased, the surface area of a solid electrolyte membrane increases, which increases the contact surface area between the electrolyte and the electrolyte membrane in the electrode. This not only allows proton conduction resistance to be lowered, but also has an anchor effect, which increases the adhesion between the electrode and the electrolyte membrane to prevent their separation.

In addition, when a minute projection cluster has a large aspect ratio, and a tall height, a portion of the electrolyte membrane enters deeply in a thickness direction of the electrode, whereby proton conductance in a thickness direction of the membrane-electrode conjugate becomes easier, which has a proton bypass effect.

To enlarge the contact area between the electrolyte and the electrolyte membrane in the electrode, it is preferable to have a narrow pitch between adjacent minute projections and have a large number of minute projections per unit surface area. However, if the density of the minute projections is too high, the carbon particles serving as the catalyst carrier are unable to enter the minute projections during application onto the electrode, so that the contact surface area instead decreases. From this viewpoint, the pitch between minute projections is preferably from 1 to 20 times the diameter of the minute projections, and more preferably from 1 to 10 times.

As the shape of the minute projections, the cross-sectional shape of the pillar-shape does not have to be invariably fixed. There may be instances where the corresponding diameter for the tip is smaller than the corresponding diameter for the bottom face of the pillar-shaped protrusions in which there are portions which become narrower from the formed base towards the tip. In terms of moldability, the minute projections preferably consist of a thermoplastic polymer material. Here, the "corresponding diameter" of a pillar-shaped minute projection is the corresponding diameter at a projection midpoint. The reason why the term corresponding diameter is used is because a projection cross-section is not necessarily circular, and may be elliptical, polygonal, asymmetrical and the like, so that the term corresponding diameter is used to encompass all of such cases.

Here, a "fuel cell" as described in the present examples is a fuel cell which uses a solid polymer electrolyte membrane as the electrolyte membrane. That is, this falls into the wide meaning of the term proton-exchange membrane fuel cell, being differentiated from the narrow meaning of proton-exchange membrane fuel cells (PEFC), which mainly use gaseous fuel (such as hydrogen gas) as fuel, and fuel cells which use liquid fuel (such as an aqueous methanol solution) as fuel. Further, among fuel cells that use a liquid as fuel, those that use methanol for fuel are known as a direct methanol fuel cell (DMFC).

While the following examples will be explained using a DMFC as the fuel cell, it will be obvious that the same effects would be achieved using a PEFC as the polymer electrolyte membrane according to the present invention.

The principles relating to the DMFC according to the present invention will now be explained.

In the fuel cell employed in the present invention, which uses methanol as the fuel, the chemical energy held by methanol is converted into direct electrical energy according to the electro-chemical reactions illustrated hereafter to generate power. An aqueous methanol solution supplied to the anode side undergoes a reaction according to Formula 1 to dissociate into carbon dioxide gas, hydrogen ions and electrons (oxidation of methanol).

$$CH_3OH + H_2O \rightarrow CO_2 + 6H^+ + 6e^- \qquad (1)$$

The produced hydrogen ions move from the anode side to the cathode side, and react at the cathode with oxygen gas which has diffused from the air and electrons on the electrode according to Formula 2 to produce water (reduction of oxygen)

$$6H^+ + 3/2O_2 + 6e^- \rightarrow 3H_2O \qquad (2)$$

Thus, as illustrated in Formula 3, the overall chemical reaction associated with electricity generation oxidizes methanol using oxygen to produce carbon dioxide gas and water, wherein the chemical reaction is the same as that of flaming combustion of methanol.

$$CH_3OH + 3/2O_2 \rightarrow CO_2 + 3H_2O \qquad (3)$$

When a DMFC is employed as a fuel cell, there is generally the problem that the anode electrode and the electrolyte membrane tend to separate, because the anode thickness at 30 to 200 μm is thicker than the cathode thickness at 10 to 40 μm. Therefore, the above-described anchor effect is thought to have a particularly important effect on the anode side of a DMFC.

In response to this problem, for example, employing the anchor effect on the anode side by setting the height of the minute projection cluster on one side of the electrolyte membrane to be higher than the height of the minute projection cluster on the other side, so that the anode electrode is formed on the side on which the minute projection cluster is higher, is remarkably effective in separation prevention. To obtain the same effect, when forming the minute projection cluster on only one side, forming the anode on the side on which the minute projection cluster is formed can be thought of.

Next, a preparation method of the electrolyte membrane for a fuel cell characterized in having a minute projection cluster formed by plastic working on one side or both sides of the polymer electrolyte membrane will be briefly explained.

That is, the method is a preparation method of an electrolyte membrane for a fuel cell characterized in that a mold having fixed flat-pattern concave portions is pressed on one side or both sides of the polymer electrolyte membrane, then the mold is removed from the polymer electrolyte membrane, wherein minute projections are formed as the convex portions of the polymer electrolyte membrane formed in the concave portions. During this preparation, the minute projections can also be formed by stretching the polymer electrolyte membrane convex portions. In addition, the diameter of the concave portions is preferably 10 μm or less.

The shape, typified by height and diameter, and pitch interval of the minute projection cluster of the polymer electrolyte membrane prepared by this method can be easily controlled, whereby a desired minute projection cluster can be formed on the surface of the polymer electrolyte membrane.

The present invention is a fuel cell comprising a polymer electrolyte membrane, a plurality of different catalytic layers formed carried on a carrier on a surface of both sides of the electrolyte membrane, diffusion layers formed in contact with the respective catalytic layers, an anode electrode formed in contact with one of the diffusion layers and a cathode electrode formed in contact with another of the diffusion layers, wherein the polymer electrolyte membrane is formed having a minute projection cluster formed on a surface thereof, and wherein a catalyst on the minute projection cluster is formed carried on the carrier.

The carrier is preferably formed from carbonization of the polymer electrolyte membrane, and the diffusion layers are preferably carbon sheets.

"Polymer electrolyte membrane" is a term for an object on which is deposited a polymer that has a functional group in the polymer skeleton having ion exchange capacity, or an object that contains a substance having ion exchange capacity in the polymer skeleton. Polymer electrolyte membranes are generally classified into cation exchange membranes and anion exchange membranes. Membranes also exist that have both exchange membranes joined together.

Cation exchange membranes include, for example, ion exchange membranes which have a sulfonate group, a carboxylate group or a phosphate group in the polymer chain in the membrane, and membranes containing an acidic substance in the polymer membrane, such as sulfuric acid, sulfonic acids, phosphoric acids, carboxylic acids or a solid acid particulate.

Anion exchange membranes include, for example, polymer membranes which have a basic group, such as an amino group, quaternary ammonium hydroxide and a guanidine group, and membranes having a solid base dispersed in the membrane. There are also membranes that have the acid or base group in the membrane taken as a base, or that have a base impregnated therein.

Employing a hydrogen ion conductive material in the electrolyte membrane for a fuel cell allows for a stable fuel cell to be attained that is not affected by oxygen gas in the air. Examples of such materials that may be used include sulfonated fluorocarbon polymers as represented by polyperfluorostyrene sulfonic acid, perfluorocarbon sulfonic acid and the like, and materials subjected to sulfonation of a hydrocarbon polymer or alkylsulfonation of a hydrocarbon polymer such as polystyrene sulfonic acid, a sulfonated polyethersulfone and a sulfonated polyetheretherketone.

Using these materials for the electrolyte membrane generally allows a fuel cell to be produced at a temperature of 80° C. or below. In addition, employing a composite electrolyte membrane in which a hydrogen ion conductive inorganic substance, such as tungsten oxide hydrate, zirconium oxide hydrate and tin oxide hydrate, is micro-dispersed in a heat resistant resin or a sulfonated resin allows for a fuel cell that operates at higher temperatures to be achieved. In particular, a composite electrolyte that uses a sulfonated polyester sulfone, a polyether sulfone or a hydrogen ion conductive inorganic substance is preferable as an electrolyte membrane having low methanol permeability of the fuel compared to polyperfluorocarbonsulfones. Whichever substance is used, employing an electrolyte membrane having high hydrogen ion conductivity and low methanol permeability can achieve more compactness and long-period power generation at a high level, which is the effect of the present examples, because the power generation-usage ratio of fuel is higher.

In addition, because of differences in material, it is easier to increase the aspect ratio of a minute projection cluster for hydrocarbon polymers compared to fluorocarbon polymers.

Polyperfluorosulfonic acid can be cited as the most typical fuel cell ion exchange membrane; examples thereof including Nafion manufactured by Dupont (U.S.), Flemion manufactured by Asahi Glass Co., Ltd., and Aciplex manufactured by Asahi Kasei Corporation.

Employing a polymer electrolyte membrane having a roughened surface in a fuel cell improves reaction efficiency, which results in an improvement in performance such as battery output. A reason for this is that extremely large irregularities are formed on the surface of the membrane, whereby the membrane surface area greatly increases. It is thought that as a result of this, ions generated from the electro-chemical reaction at the membrane surface can be efficiently dissolved. A polymer electrolyte membrane also includes films and sheets.

A film or substrate comprising a minute projection cluster uses a minute mold (precision metal mold) formed with concave portions (hereinafter, referred to as "pits") which have a specific planar shape to press onto a thermoplastic polymer electrolyte membrane for forming a pattern that matches the mold of the pit cluster. The mold is preferably silicon, quartz or the like. When the mold is removed from the polymer electrolyte membrane, thermoplastic resin that has entered the pits is stretched, whereby a minute projection cluster having a desired shape can be formed. In particular, it is possible to adjust the height of the projections according to the aspect ratio of the mold irregularities, whereby the position of the projections and the bottom surface area can be adjusted according to the position and the aperture area of the concave portions formed in the mold.

The projections which constitute the minute projection cluster are slightly larger in their bottom face portion corresponding diameter than their tip corresponding diameter, wherein it is preferable to ensure that the resin minute projections are able to stand by themselves and support themselves. It is also preferable that the minute projections have a portion that becomes narrower from the base towards the tip, and are integrally formed.

It is possible to make the minute projection aggregate into a structure in which the minute projections are closely-spaced, whereby the individual minute projections can be made to be difficult to crush, and difficult to remove.

The above-described mold is pressed onto the thermoplastic resin thin film, and removed therefrom to transfer the mold shape to the electrolyte membrane. Here, in forming minute pillar-shaped structures having a large aspect ratio, it is preferable during removal of the mold to form the minute projection cluster to be slightly smaller than the pits, but longer than the pit depth, by stretching the resin pressed into the pits. How much the corresponding diameter and length of the minute projections become depends on the type of resin used, properties (molecular weight etc.) and molding conditions (pit depth, temperature, molding pressure etc.), making it preferable to confirm beforehand using a wide variety of experiments.

According to the present examples, surface irregularities can be controlled to obtain a polymer electrolyte membrane that has irregularities evenly formed on the membrane surface. While in the conventional art the shape of irregularities was only a hilly shape, so that there was a limit to surface area enlargement, according to the present examples the surface area can be increased even further.

As a result, a polymer electrolyte membrane can be obtained which has large surface irregularities, is very three-dimensional, and has a large surface area. In addition, using such an electrolyte membrane for a fuel cell fuel cell can improve power output over a fuel cell using a conventional hilly-shaped electrolyte membrane.

In particular, a film can be provided which comprises a minute projection cluster in which the position and shape and height of the bottom surface area can be controlled. Further, the film can be formed by a simple production technique using press molding to produce a pillar-shaped minute projection cluster.

Examples of the polymer electrolyte membrane according to the present invention will now be explained in detail.

EXAMPLE 1

FIG. 1 is a scanning electron microscopic image of projection aggregate 100 formed on one side of a polymer electrolyte membrane. As illustrated in FIG. 1, projection aggregate 100 comprises pillar-shaped minute projections 104 consisting of a plurality of extremely tiny projections. These pillar-shaped minute projections 104 are formed by press molding using a metal mold. As a polymer electrolyte membrane, Nafion 117 manufactured by Dupont (U.S.) was employed and cut into 10 cm edges.

Figure 2:
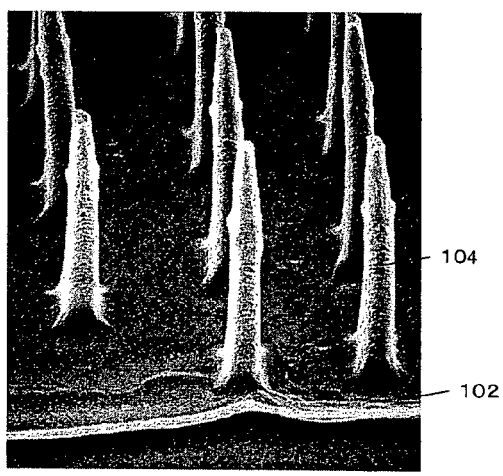
FIG. 2 is an enlarged view of FIG. 1.

FIG. 2 is an enlarged view observed using a scanning electron microscope of projection aggregate 100. The pillar-shaped minute projections 104 have a height of approximately 3 µm, and a square section of approximately 300 nm×300 nm at the base. The upper 1 µm portion of the pillar-shaped minute projections 104 is a smooth surface, and the surface of the portion 2 µm from the base is a striped pattern. Further, the pillar-shaped minute projections 104 are arrayed in a cycle (pitch) of height 3 µm and 1 µm.

The corresponding diameter of the pillar-shaped minute projections 104 is 300 nm and the height is 3 µm, thus making the ratio of height to one side (aspect ratio) to be 10, which is substantially greater than 1. The tip cross-sectional area of the pillar-shaped minute projections 104 is smaller than the cross-sectional area of the bottom face, and broadens going towards the bottom. However, while the shape of the pillar-shaped minute projections becomes narrower going from the base to the tip, a shape which becomes narrower from the base towards the tip, which has a thick portion at the tip, is also acceptable.

The pillar-shaped minute projections 104 are formed on the polymer electrolyte membrane 102, integral therewith, and because they have a shape that broadens going from the tip towards the bottom face, the projections are difficult to remove from the polymer electrolyte membrane of the base.

Figure 3:
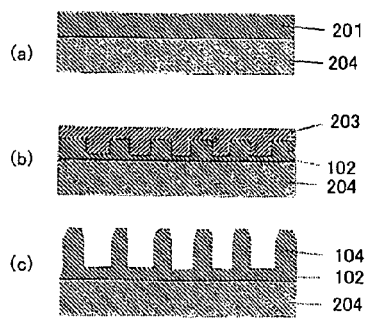
FIG. 3 is a flow diagram that illustrates the production process of a pillar-shaped minute projection cluster.

FIG. 3 is a diagram which illustrates the production process of the pillar-shaped minute projections 104: (a) a polymer electrolyte membrane is set on a metal mount 204; (b) pits (concave portions) on the surface having a depth of 1 µm and a diameter of 500 nm are press molded onto the surface of the polymer electrolyte membrane 201 by a precision metal mold 203 formed at a pitch of 1 µm and having a fixed planar shape; (c) then, the pillar-shaped minute projections 104 can be formed by vertically lifting up the mold 203.

In the present example, since the tip of the pillar-shaped minute projections is smaller than the bottom face of the pillar-shaped minute projections to have a broadened shape, the pillar-shaped minute projection cluster is difficult to remove from the substrate. In addition, because the pillar-shaped minute projection cluster is the same material as the substrate, the pillar-shaped minute projection cluster is difficult to remove from the substrate.

As illustrated in FIG. 3, the aspect ratio of the pillar-shaped minute projections 104 is approximately 4 times the aspect ratio of the concave portion formed on the mold 203. That is, although it is usually difficult to form a concave portion having a large aspect ratio on the mold 203, if the technique according to the present invention is used, pillar-shaped minute projections 104 having a high aspect ratio can be formed.

The diameter and height of the pillar-shaped minute projections 104 can be controlled by adjusting the depth of the mold 203 concave portions, the melt viscosity of the polymer electrolyte membrane 201 and the like. In addition, by enlarging the aperture surface area of the mold 203 concave portions, the size of the pillar-shaped minute projections 104 bottom portion can be controlled. By controlling the position of the mold 203 concave portions, the position at which the pillar-shaped minute projections 104 are formed can be controlled.

Further, by making the polymer electrolyte membrane 201 material to be thermoplastic, and adjusting the temperature during formation of the pillar-shaped minute projections 104, the shape of the pillar-shaped minute projections 104 can be easily controlled.

Next, the polymer electrolyte membrane 201 which formed the above-described pillar-shaped minute projections 104 was heated at 100° C. under a nitrogen atmosphere for 2 minutes, whereby a carbonized layer was formed on the surface thereof.

Next, on the formed surface of the carbonized layer pillar-shaped minute projections 104, a platinum-ruthenium 80% by weight alloy was deposited onto the fuel supply side (anode electrode) and platinum was deposited onto the oxidant supply side (cathode electrode) to a respective carrier amount of 0.3 mg/cm$^2$ using their respective salts.

In the present example, the anode electrode and the cathode electrode were separately formed, wherein the opposite both sides of the formed faces of the pillar-shaped minute projections 104 were contacted with each other to give an integral membrane electrode assembly (MEA). The pillar-shaped minute projections 104 can be formed by simultaneously pressing the polymer electrode membrane 201 from both sides using the mold 203, then simultaneously removing the mold therefrom to form pillar-shaped minute projections 104 on both sides, whereby the anode electrode and the cathode electrode can be formed in the manner described above.

The present Example provides a polymer electrolyte membrane that can improve the output of a fuel cell, which has large surface irregularities, is very three-dimensional and has a large surface area, the production method thereof and a fuel cell using the same. In particular, a film can be provided which comprises a minute projection cluster in which the planar shape and height of the position and bottom surface area can be freely controlled. In addition, because a thermoplastic resin is used to produce the pillar-shaped minute projection cluster, formation can be carried out by a low-cost production technique using press molding.

EXAMPLE 2

In this Example, after the pillar-shaped minute projections 104 were formed, a carbonized layer was formed on the formed faces thereof by sputtering to a thickness of 10 nm. Next, on the formed surfaces of the carbonized layer pillar-shaped minute projections 104, a platinum-ruthenium 80% by weight alloy was deposited onto the fuel supply side (anode electrode) and platinum was deposited onto the oxidant supply side (cathode electrode) to a respective carrier amount of 0.3 mg/cm$^2$ using their respective salts.

In the present Example as well, the anode electrode and the cathode electrode were separately formed, wherein the opposite both sides of the formed faces of the pillar-shaped minute projections 104 were contacted with each other for formation as an integral electrode. Further, the pillar-shaped minute projections 104 can be formed by simultaneously pressing the polymer electrode membrane 201 from both sides using the mold 203, then simultaneously removing the mold therefrom to form pillar-shaped minute projections 104 on both sides, whereby an anode electrode and a cathode electrode can be formed in the manner described above to produce an MEA.

EXAMPLE 3

An electrode material comprising a powder of the polymer electrolyte membrane of Example 1, carbon powder, a platinum-ruthenium 80% by weight alloy or platinum powder, 1-propanol, 2-propanol and water, was formed onto the surface of a conductive thin membrane to a thickness of 100 µm with nitrogen gas as a carrier, whereby an anode electrode and a cathode electrode were directly formed by forming pillar-shaped minute projections in the same manner as in Example 1 using a mold, to produce an MEA.

EXAMPLE 4

Figure 4:
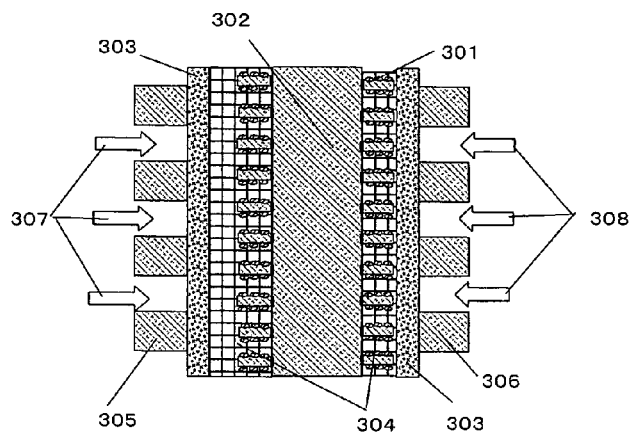
FIG. 4 is a cross-sectional view that illustrates the structure of a fuel cell.

FIG. 4 is a cross-sectional view of the membrane electrode assembly, and the peripheral components thereof, formed according to Examples 1-3. An Al plate was employed on both the anode electrode collector material 305 and the cathode electrode collector material 306, a carbon sheet 303 was employed on the diffusion layer, and a gel polymer electrolyte agent was formed on the formed surface of the pillar-shaped minute projections. According to this Example, since the membrane clearly has large irregularities compared with a conventional polymer electrolyte membrane, reaction efficiency improves, which results in performance, such as battery output, improving.

EXAMPLE 5

Figure 5:
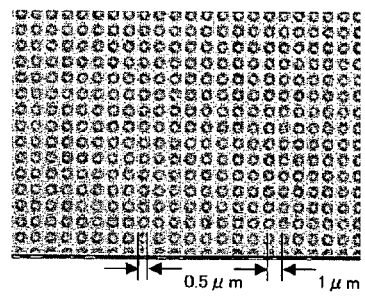
FIG. 5 is a microscope photograph of a minute projection cluster formed according to the Examples.

An electrolyte membrane was produced comprising on its surface a minute projection cluster according to the following method. First, an electrolyte membrane that was an alkylsulfonated hydrocarbon polymer, in this Example, a sulfomethylated polyethersulfone which had size 60 mm edges and a thickness of 45 µm was prepared. Next, pores having a diameter of 0.5 µm and a depth of 0.25 µm were formed on the surface over the entire surface at a pitch of 1 µm. Two 50 mm edged metal molds were prepared which had been subjected to mold release treatment using a fluorine-type release agent for preventing adhesion of the electrolyte membrane to the surface, and disposed so that the pore side of the metal mold on both sides of the above-described electrolyte membrane faced towards the electrolyte membrane side. These were then arranged in a vacuum press apparatus. After deaerating to about 300 Pa, pressing was carried out at a temperature of 150° C., load of 700 kgf and for a period of 300 s. After pressing, once the temperature had dropped to 80° C. or below, the metal mold and electrolyte membrane were removed from the press apparatus, and the metal mold was removed from both sides of the electrolyte membrane to prepare an electrolyte membrane having a minute projection cluster on its surface. A microscope photograph of the prepared electrolyte membrane is illustrated in FIG. 5. A minute projection cluster having a diameter of 0.25 µm and a height of 0.25 µm was confirmed as being formed on the electrolyte surface.

Next, on both surfaces of the electrolyte membrane formed having this minute projection cluster, a catalytic layer was formed by a spray method respectively onto the anode side at a thickness of 160 µm and the cathode side at a thickness of 55 µm. Here, a substance that dispersion-supported on a carbon-type powder carrier (Ketjen Black EC; manufactured by Lion Corporation) a mixed metal of platinum and ruthenium having platinum support content 50 wt % was used as the anode catalyst, and as the cathode catalyst a substance that dispersion-supported particles on a carbon-type powder carrier (Ketjen Black EC; manufactured by Lion Corporation) a platinum particulate of 50 wt % was used. In the present Example, the platinum content in the electrode was 6 mg/cm$^2$ for the anode electrode, and 2 mg/cm$^2$ for the cathode electrode. In the binder, 5% of Nafion solution was used.

Figure 6A:
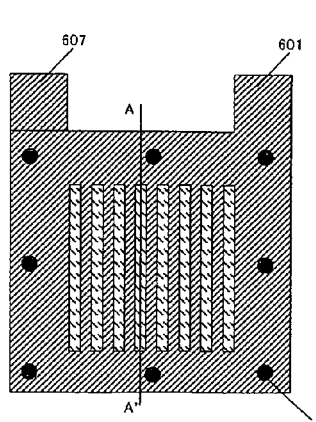
FIG. 6a is a flat plan view of an evaluation cell used for MEA power generation characteristics evaluation.
Figure 6B:
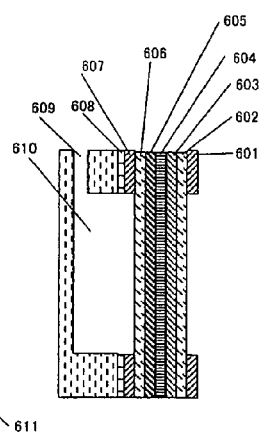
FIG. 6b is a cross-sectional plan view of an evaluation cell used for MEA power generation characteristics evaluation.

The prepared MEA was evaluated for its power generation characteristics using the evaluation cell illustrated in FIGS. 6a and 6b. The MEA formed having the anode catalyst 605 and the cathode catalyst 603 on the electrolyte membrane 604, which was formed having minute projections on both sides thereof according to the above method, was contacted with 300 µm of carbon cloth (CL; manufactured by Goretex) as diffusion layers 602 and 606. The cathode electrode plate 601 and anode electrode plate 607, which were formed having slits to allow contact with air and an aqueous methanol solution, were contacted with the respective diffusion layers and matched via packing 608 to the combustion fuel chamber 610 formed having a methanol solution inlet at an upper portion thereof, to produce an evaluation cell threadably mounted with a fixing screw. Fuel having a methanol concentration of 20% was charged into this cell, wherein an electronic load device (1480 Model; manufactured by Paratron) was connected to the respective electrodes for evaluating power generation characteristics at an evaluation temperature of 30° C. under natural expiration. The results are shown in Table 1. Output density was 17.9 mW/cm$^2$.

Compared with Comparative Example 1, which did not have a minute projection cluster formed on its surface, a large power output was achieved. This is thought to be, in addition to the effects of an increase in surface area resulting from the formation of a minute projection cluster on the electrolyte membrane surface, due to the fact that through the regular formation of pillar-shaped structures the columns themselves acted as a hydrogen ion bypass, so that hydrogen ions were more efficiently accepted from the catalyst layer, thus resulting in an increase in the transporting ability into inside the electrolyte membrane. In addition, it is thought that by using a pillar-shaped structure, compared with a flat surface, pillar-shaped projection tips serve as singularities in terms of electric potential, wherein the drawing ability of hydrogen ions from the catalytic layer improves, which results in the characteristics improving.

EXAMPLE 6

An electrolyte membrane comprising a minute projection cluster was prepared in the same manner as in Example 1. During preparation, pores having a diameter of 0.5 µm and a depth of 1 µm on the metal mold for forming the minute projection cluster were employed over the entire surface at a pitch of 1 µm to form a minute projection cluster having a diameter of 0.5 µm and a height of 1 µm on the electrolyte membrane surface.

Next, the electrolyte membrane formed having the minute projection cluster was assembled into an MEA according to the same method as in Example 1, and evaluated for power generation characteristics in the same manner as in Example 1. The results are shown in Table 1. The power density was 24.8 mW/cm², showing that the characteristics improved considerably.

EXAMPLE 7

Figure 7:
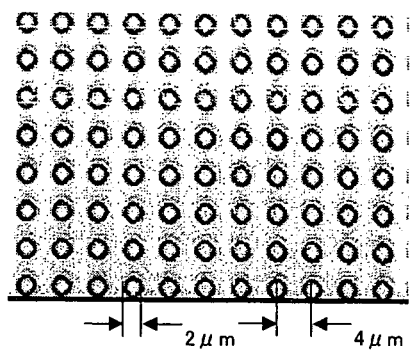
FIG. 7 is a microscope photograph of a minute projection cluster formed according to the Examples.

An electrolyte membrane comprising a minute projection cluster was prepared in the same manner as in Example 1. During preparation, pores having a diameter of 2 μm and a depth of 1 μm on the metal mold for forming the minute projection cluster were employed over the entire surface at a pitch of 4 μm to form a minute projection cluster having a diameter of 2 μm and a height of 1 μm on the electrolyte membrane surface. A laser electroscope photograph of the minute projection cluster post-formation electrolyte surface is shown in FIG. 7.

Next, the electrolyte membrane formed having the minute projection cluster was assembled into an MEA according to the same method as in Example 1, and evaluated for power generation characteristics in the same manner as in Example 1. The results are shown in Table 1. The power density was 15.8 mW/cm², showing that the characteristics improved considerably.

EXAMPLE 8

Figure 8:
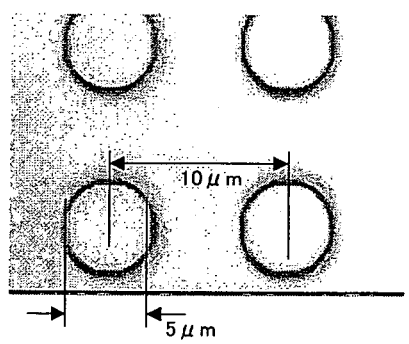
FIG. 8 is a microscope photograph of a minute projection cluster formed according to the Examples.

An electrolyte membrane comprising a minute projection cluster was prepared in the same manner as in Example 1. During preparation, pores having a diameter of 5 μm and a depth of 1 μm on the metal mold for forming the minute projection cluster were employed over the entire surface at a pitch of 10 μm to form a minute projection cluster having a diameter of 5 μm and a height of 1 μm on the electrolyte membrane surface. A laser electroscope photograph of the minute projection cluster post-formation electrolyte surface is shown in FIG. 8.

Next, the electrolyte membrane formed having the minute projection cluster was assembled into an MEA according to the same method as in Example 1, and evaluated for power generation characteristics in the same manner as in Example 1. The results are shown in Table 1. The power density was 11.6 mW/cm², showing that the characteristics improved considerably.

EXAMPLE 9

An electrolyte membrane comprising a minute projection cluster was prepared in the same manner as in Example 1. During preparation, pores having a diameter of 5 μm and a depth of 2.6 μm on the metal mold for forming the minute projection cluster were employed over the entire surface at a pitch of 10 μm to form a minute projection cluster having a diameter of 5 μm and a height of 2.6 μm on the electrolyte membrane surface.

Next, the electrolyte membrane formed having the minute projection cluster was assembled into an MEA according to the same method as in Example 1, and evaluated for power generation characteristics in the same manner as in Example 1. The results are shown in Table 1. The power density was 14.0 mW/cm², showing that the characteristics improved considerably.

EXAMPLE 10

An electrolyte membrane comprising a minute projection cluster on only one side was prepared in the same manner as in Example 1. During preparation, as shown in Table 1, metal molds, which had a depth of 1 μm and a mix of many diameters and pitches, for forming the minute projection cluster were employed; the diameters being from 0.16 μm to 400 μm and the pitches being from 0.36 μm to 800 μm.

Figure 9:
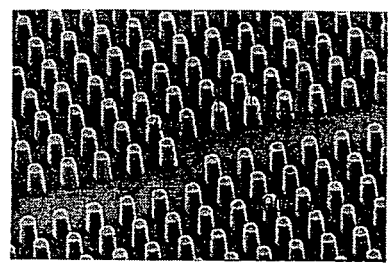
FIG. 9 is an SEM photograph of a minute projection cluster formed according to the Examples.

FIG. 9a illustrates one example of a post-transfer electrolyte membrane surface SEM photograph. It can be seen that a minute pillar-shaped structure having a diameter of 0.5 μm, height of 1 μm and pitch of 1 μm is formed. In addition to this structure, minute projection clusters were formed, manifested as minute pillar-shaped structures having a diameter of from 0.16 μm to 400 μm and a height of 1 μm.

Next, an MEA was assembled according to the same method as in Example 1, taking the face formed with the minute projection cluster as the anode side. During assembly, the electrode platinum content was set at 1.5 mg/cm² for the anode and the cathode catalyst set at 10 mg/cm². Power generation characteristics were evaluated in the same manner as in Example 1. The results are shown in Table 1. Compared with the MEA of Comparative Example 2, which did not have a minute projection cluster formed on its surface, the power density was 15.6 mW/cm², showing that the characteristics improved considerably.

EXAMPLE 11

An electrolyte membrane comprising a minute projection cluster on only one side was prepared in the same manner as in Example 1. During preparation, as shown in Table 1, as the metal molds for forming the minute projection cluster, molds having a depth of 1 μm and a mix of many diameters and pitches were employed; the diameters being from 0.18 μm to 400 μm and the pitches being from 0.36 μm to 800 μm. Minute projection clusters were formed, manifested as minute pillar-shaped structures having a diameter of from 0.16 μm to 400 μm and a height of 1 μm.

Next, an MEA was assembled according to the same method as in Example 1, taking the face formed with the minute projection cluster as the cathode side. During assembly, the electrode platinum content was set at 1.5 mg/cm² for the anode and the cathode catalyst set at 10 mg/cm². Power generation characteristics were evaluated in the same manner as in Example 1. The results are shown in Table 1. Compared with the MEA of Comparative Example 2, which did not have a minute projection cluster formed on its surface, the power density was 9.1 mW/cm², showing that the characteristics improved considerably.

EXAMPLE 12

An electrolyte membrane comprising a minute projection cluster on only one side was prepared in the same manner as in Example 10 employing a Nafion N117 (manufactured by Dupont) as the electrolyte membrane. During preparation, as shown in Table 1, as the metal molds for forming the minute projection cluster, molds having a depth of 0.2 μm and a mix of many diameters and pitches were employed; the diameters being from 0.18 μm to 400 μm and the pitches being from 0.36 μm to 800 μm. Minute projection clusters were formed, manifested as minute pillar-shaped structures having a diameter of from 0.16 μm to 400 μm and a height of 0.2 μm.

Next, an MEA was assembled according to the same method as in Example 1, taking the face formed with the minute projection cluster as the anode side. During assembly, the electrode platinum content was set at 1.5 mg/cm² for the anode and the cathode catalyst set at 10 mg/cm². Power generation characteristics were evaluated in the same manner as in Example 1. The results are shown in Table 1. Compared with the MEA of Comparative Example 3, which did not have a minute projection cluster formed on its surface, the power density was 38.5 mW/cm², showing that the characteristics improved considerably.

EXAMPLE 13

Figure 10:
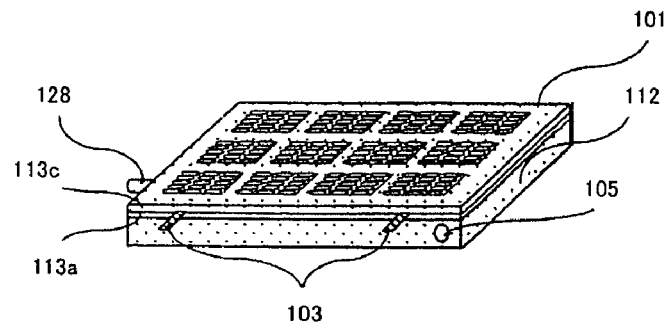
FIG. 10 is an external plan view of a DMFC.

An example of a personal digital assistant DMFC which employed an electrolyte membrane formed having a minute projection cluster will now be explained. FIG. 10 illustrates the general concept of a DMFC according to the present Example. This fuel cell comprises a fuel chamber 112; an MEA using an electrolyte membrane prepared in the same manner as that in Example 6 (not shown); and a cathode end plate 113c and an anode end plate 113a which sandwich a gasket, wherein a power generator is mounted on only one side of the fuel chamber 112. A fuel supply pipe 128 and an exhaust hole 105 are disposed on the outer periphery of the fuel chamber 112. A pair of output terminals 103 is disposed on an outer periphery of the anode end plate 113a and cathode end plate 113c. The material is a high-pressure vinyl chloride for the fuel chamber 112, and a polyimide resin film for the anode end plate. A glass fiber strengthened epoxy resin was employed for the cathode end plate.

Figure 11:
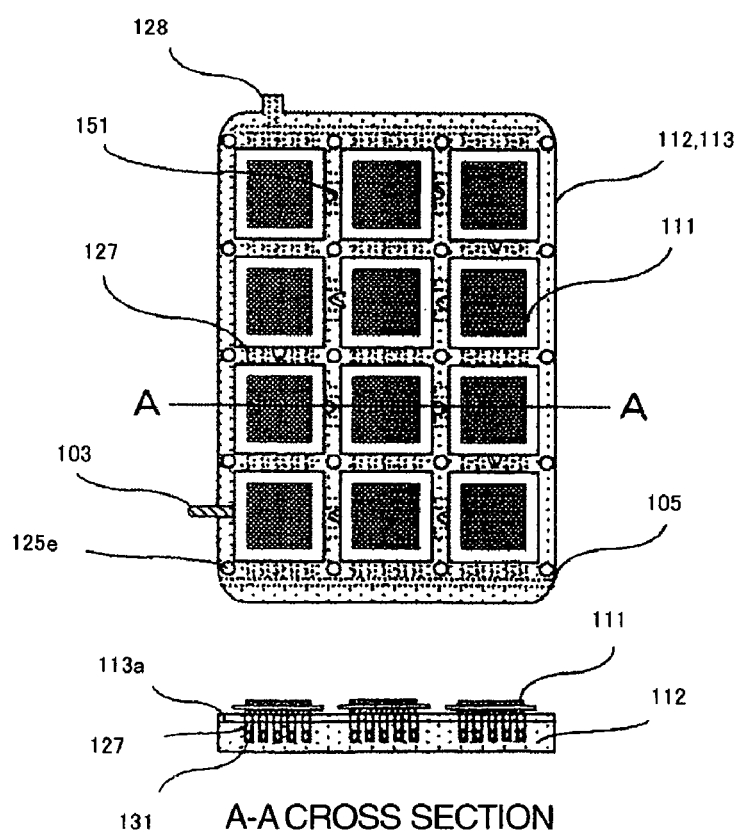
FIG. 11 illustrates an MEA mounted layout for a DMFC and the cross-sectional structure thereof.

FIG. 11 illustrates the mounting layout of an MEA and the cross-sectional structure thereof. Mounted on this DMFC are 12 MEA of a size 22 mm×24 mm, in which the power generator size is 16 mm×18 mm, on the surface slits of the anode end plate 113a, which is integrally formed with the fuel chamber 112. Inside the fuel chamber, as illustrated by the FIG. 11A-A cross-sectional view, a gas-liquid separation module combined with a gas-liquid separation pipe 131 is inserted into a fuel distribution channel 127 disposed in the fuel chamber 112. One end of the gas-liquid separation module is connected to the exhaust hole 105. The other end of the gas-liquid separation module is connected to the fuel supply pipe 128 located on the outer periphery of the fuel chamber 112. In FIG. 11 a current collector, not-shown, is adhered to the anode end plate outer surface so that it is in the same plane as the anode end plate, wherein inter-connectors 151 and output terminals 103 are provided for connecting in series with the respective electric cell.

Figure 12:
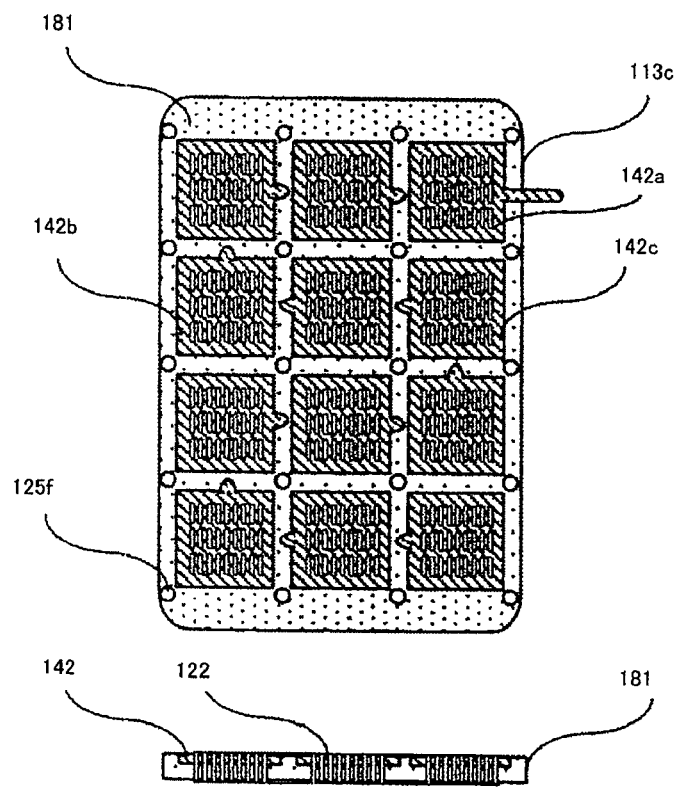
FIG. 12 is a view of a cathode end plate structure for a DMFC.

The current collector material uses a titanium plate having a thickness of 0.3 mm, wherein the face connecting to the electrode has first had its surface washed before being subjected to gold deposition to a thickness of about 0.1 μm. FIG. 12 illustrates a cathode end plate 113c structure which secures the MEA for connecting each battery in series. A glass fiber strengthened epoxy resin plate of 2.5 mm is employed as a substrate 181 on the cathode end plate 113c. The surface of this plate was subjected to gold deposition in the same manner as above, and adhered with an epoxy resin to the current collectors 142a, 142b, 142c, which are made of titanium and have a thickness of 0.3 mm. Slit 122 for air dispersion is disposed beforehand on the substrate 181 and the current collector 142, and adhered so that they are in communication with each other.

The size of the power supply thus prepared was 115 mm×90 mm×9 mm. An aqueous methanol solution (30 wt %) was charged into the fuel chamber 112 of the prepared fuel cell, wherein when a power generation test at room temperature was carried out, the power output was 4.2 V, 860 mW.

The DMFC according to this Example is a compact size compared with the conventional DMFC having the same power output, and can be thought of as being suitable for a portable fuel cell. By the same token, if the size is kept as a conventional size, a high power output can be achieved.

COMPARATIVE EXAMPLE 1

Employing an electrolyte of the same material as Example 5, and without forming a minute projection cluster, the power generation characteristics of a membrane assembled into an MEA using the same method as that in Example 5 were evaluated using the same method as in Example 1. The results were a power density of 9.8 mW/cm².

COMPARATIVE EXAMPLE 2

Employing an electrolyte of the same material as Example 5, and without forming a minute projection cluster, the power generation characteristics of a membrane assembled into an MEA using the same method as in Example 10 were evaluated using the same method as in Example 10. The results were a power density of 7.3 mW/cm².

COMPARATIVE EXAMPLE 3

Employing an electrolyte of the same material as Example 12, and without forming a minute projection cluster, the power generation characteristics of a membrane assembled into an MEA using the same method as in Example 12 were evaluated using the same method as in Example 12. The results were a power density of 26.9 mW/cm².

TABLE 1

|  | Example 5 | Example 6 | Example 7 | Example 8 | Example 9 | Example 10 | Example 11 | Example 12 | Comparative Example 1 | Comparative Example 2 | Comparative Example 3 |
|---|---|---|---|---|---|---|---|---|---|---|---|
| Membrane Material | HC membrane | HC membrane | HC membrane | HC membrane | HC membrane | HC membrane | HC membrane | Nafion | HC membrane | HC membrane | Nafion |
| Pillar Work Face | Both sides | Both sides | Both sides | Both sides | Both sides | Anode | Cathode | Anode | — | — | — |
| Pillar Diameter/Pitch (μm/μm) | 0.5/1 | 0.5/1 | 2/4 | 5/10 | 5/10 | 400/800,1/2, 1/3,1/4,0.5/ 1,0.5/1.5, 0.5/2,0.35/ 0.7,0.35/ 1.05,0.35/ 1.4,0.25/ 0.5,0.25/ | 400/800,1/2, 1/3,1/4,0.5/ 1,0.5/1.5, 0.5/2,0.35/ 0.7,0.35/ 1.05,0.35/ 1.4,0.25/ 0.5,0.25/ | 400/800,1/2, 1/3,1/4,0.5/ 1,0.5/1.5, 0.5/2,0.35/ 0.7,0.35/ 1.05,0.35/ 1.4,0.25/0.5, 0.25/0.75, | — | — | — |

TABLE 1-continued

| | Example 5 | Example 6 | Example 7 | Example 8 | Example 9 | Example 10 | Example 11 | Example 12 | Comparative Example 1 | Comparative Example 2 | Comparative Example 3 |
|---|---|---|---|---|---|---|---|---|---|---|---|
| | | | | | | 0.75,0.25/1, 0.22/0.44, 0.22/0.66, 0.22/0.88, 0.2/0.4,0.2/ 0.6,0.2/0.8, 0.18/0.36, 0.18/0.54, 0.18,0.18/ 0.72,0.16/ 0.32,0.16/ 0.48,0.16/ 0.64 | 0.75,0.25/1, 0.22/0.44, 0.22/0.66, 0.22/0.88, 0.2/0.4,0.2/ 0.6,0.2/0.8, 0.18/0.36, 0.18/0.54, 0.18,0.18/ 0.72,0.16/ 0.32,0.16/ 0.48,0.16/ 0.64 | 0.25/1,0.22/ 0.44,0.22/ 0.66,0.22/ 0.88,0.2/0.4, 0.2/0.6,0.2/ 0.8,0.18/ 0.36,0.18/ 0.54,0.18, 0.18/0.72, 0.16/0.32, 0.16/0.48, 0.16/0.64 | | | |
| Pillar Height (μm) | 0.25 | 1 | 1 | 1 | 2.6 | 1 | 1 | 0.2 | — | — | — |
| Power Output (mW/cm$^2$) | 17.9 | 24.8 | 15.8 | 11.6 | 14 | 15.6 | 9.1 | 38.5 | 9.8 | 7.3 | 26.9 |

EXAMPLE 14

Figure 13:
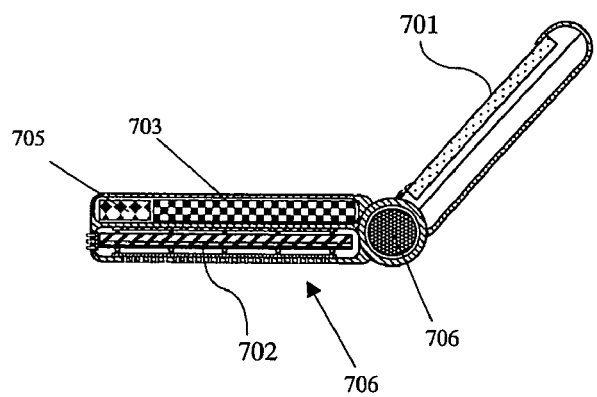
FIG. 13 illustrates a personal digital assistant mounted with a DMFC.

FIG. 13 illustrates an example in which the DMFC prepared in Example 13 is mounted on a personal digital assistant. This personal digital assistant comprises a display device 701; a DMFC 702; a main board 703 mounted with electronic devices and electronic circuits such as a processor, volatile and nonvolatile memory, a power output controller, a DMFC and secondary battery hybrid controller and a fuel monitor; and a digital assistant main body 705 mounted with a lithium ion secondary battery 704, wherein the personal digital assistant has a folding type configuration that is connected by a hinge 706 which serves as a fuel cartridge tank holder.

According to the present Example, the DMFC prepared in Example 13 can be used as a power source for a personal digital assistant. Compared to a personal assistant mounted with a conventional fuel cell, the present personal assistant is compact and light-weight.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electrolyte membrane for a fuel cell comprising a cluster of minute projections on both sides of a polymer electrolyte membrane, wherein the minute projections, of the cluster of minute projections, are formed with a prescribed shape with a planar surface, wherein the minute projections, of the cluster of minute projections, are pillar-shaped, and wherein a height of the cluster of minute projections on one side of the electrolyte membrane is different from a height of the cluster of minute projections on the other side of the electrolyte membrane;
   wherein a pitch between the minute projections is from 1 μm to 20 μm, said pitch being a distance between centers of adjacent minute projections;
   wherein a ratio (H/D) of a height (H) to a corresponding diameter (D) of the minute projections is larger than 1; and
   wherein the pitch between minute projections is from 1 to 20 times the diameter of the minute projections.

2. The electrolyte membrane for a fuel cell according to claim 1, wherein the minute projections have a diameter of from 10 nm to 500 μm.

3. The electrolyte membrane for a fuel cell according to claim 1, wherein the minute projections have a height of from 50 nm to 5000 μm.

4. The electrolyte membrane for a fuel cell according to claim 1, wherein a corresponding diameter of a tip of the minute projections is less than a corresponding diameter of a bottom face.

5. The electrolyte membrane for a fuel cell according to claim 1, wherein the minute projections comprises a portion which becomes narrower going from a formed base towards a tip.

6. The electrolyte membrane for a fuel cell according to claim 1, wherein the electrolyte membrane for a fuel cell comprises a thermoplastic polymer material.

7. The electrolyte membrane for a fuel cell according to claim 1, wherein said ratio is 1-100.

8. The electrolyte membrane for a fuel cell according to claim 1, adapted to have one side thereof adjacent an anode of the fuel cell and the other side thereof adjacent a cathode of the fuel cell, and wherein the minute projections on the one side adjacent the anode are higher than the minute projections on the other side thereof adjacent the cathode.

9. The electrolyte membrane for a fuel cell according to claim 1, wherein the pitch between minute projections is from 1 to 10 times the diameter of the minute projections.

10. The electrolyte membrane for a fuel cell according to claim 1, wherein the cluster of minute projections provides an anchoring effect between electrodes of the fuel cell and the electrolyte membrane.

11. A fuel cell comprising a polymer electrolyte membrane, a plurality of different catalytic layers formed carried on a carrier on both sides surfaces of the electrolyte membrane, dispersion layers formed in contact with the respective catalytic layers, an anode electrode formed in contact with one of the dispersion layers, and a cathode electrode formed in contact with another of the dispersion layers,
   wherein the polymer electrolyte membrane is formed having a cluster of minute projections, formed on both side surfaces thereof, wherein a catalyst on the minute projection cluster is formed carried on the carrier, wherein the minute projections, of the cluster of minute projections, are formed with a prescribed shape with a planar surface, wherein the minute projections, of the cluster of minute projections, are pillar-shaped, wherein a height of the cluster of minute projections on one side surface of the electrolyte membrane is different from a height of the cluster of minute projections on the other side surface of the electrolyte membrane, wherein a pitch between the minute projections is from 1 µm to 20 µm, said pitch being a distance between centers of adjacent minute projections, wherein a ratio (H/D) of a height (H) to a corresponding diameter (D) of the minute projections is larger than 1, and wherein the pitch between minute projections is from 1 to 20 times the diameter of the minute projections.

12. A fuel cell according to claim 11, wherein the carrier is formed by carbonization of the polymer electrolyte membrane.

13. A fuel cell according to claim 11, wherein the dispersion layers are carbon sheets.

14. A fuel cell which employs the electrolyte membrane for a fuel cell according to claim 1.

15. An electric device which employs the fuel cell according to claim 14.

16. A fuel cell according to claim 11, wherein the pitch between minute projections is from 1 to 10 times the diameter of the minute projections.

17. The fuel cell according to claim 11, wherein the cluster of minute projections provides an anchoring effect between the anode electrode and the electrolyte membrane, and between the cathode electrode and the electrolyte membrane.

18. The fuel cell according to claim 11, wherein the height of the cluster of minute projections on the anode electrode side of the electrolyte membrane is greater than the height of the cluster of minute projections on the cathode electrode side of the electrolyte membrane.

* * * * *